US011093229B2

(12) United States Patent
Tiwari et al.

(10) Patent No.: US 11,093,229 B2
(45) Date of Patent: Aug. 17, 2021

(54) DEPLOYMENT SCHEDULING USING FAILURE RATE PREDICTION

(71) Applicant: International Business Machines Corporation, Armonk, NY (US)

(72) Inventors: Pranshu Tiwari, Delhi (IN); Harish Bharti, Dublin, OH (US); Naveen Narayanaswamy, Bengaluru (IN); Ram Prasad Reddy Munagala, Kadapa (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/749,465

(22) Filed: Jan. 22, 2020

(65) Prior Publication Data
US 2021/0224053 A1    Jul. 22, 2021

(51) Int. Cl.
  *G06F 9/44*    (2018.01)
  *G06F 8/61*    (2018.01)
  *G06N 20/00*    (2019.01)

(52) U.S. Cl.
  CPC .............. *G06F 8/61* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 9,146,791 B2 * | 9/2015 | Sorenson | ............ | G06F 11/0757 |
| 9,740,478 B2 | 8/2017 | Doganata et al. | | |
| 10,311,404 B1 * | 6/2019 | Lecue | ....................... | G06N 3/04 |
| 2002/0016957 A1 * | 2/2002 | Ishiwata | ............... | G06F 8/4434 |
| | | | | 717/146 |
| 2005/0044451 A1 * | 2/2005 | Fry | ..................... | G06F 11/3485 |
| | | | | 714/38.1 |
| 2007/0079170 A1 * | 4/2007 | Zimmer | ................ | G06F 11/008 |
| | | | | 714/6.23 |
| 2013/0085742 A1 * | 4/2013 | Barker | .................. | G06F 9/5088 |
| | | | | 703/22 |

(Continued)

FOREIGN PATENT DOCUMENTS

| | | |
|---|---|---|
| CN | 106330576 A | 1/2017 |
| CN | 109344017 A | 2/2019 |

*Primary Examiner* — Insun Kang
(74) *Attorney, Agent, or Firm* — Garg Law Firm, PLLC; Rakesh Garg; Michael O'Keefe

(57) ABSTRACT

A failure rate model modeling a failure rate of a training functionality deployment in a training set of functionality deployments is constructed. The failure rate model is configured to receive functionality deployment data and output a corresponding failure rate prediction. Using the failure rate model, a set of functionality deployment failure rates is predicted, a functionality deployment failure rate in the set of functionality deployment failure rates corresponding to an upcoming functionality deployment. Using the set of functionality deployment failure rates, a deployment sequence of the set of upcoming functionality deployments is constructed to minimize a predicted overall failure rate of the set of upcoming functionality deployments. The deployment of each functionality deployment in the set of upcoming functionality deployments is caused, the deployment comprising activating the upcoming functionality program code according to the deployment sequence.

17 Claims, 7 Drawing Sheets

(56) References Cited

U.S. PATENT DOCUMENTS

| | | | |
|---|---|---|---|
| 2013/0332399 A1* | 12/2013 | Reddy | H04L 45/16 706/12 |
| 2014/0298091 A1 | 10/2014 | Carlen et al. | |
| 2015/0074023 A1* | 3/2015 | Gu | G06N 3/08 706/12 |
| 2015/0331963 A1* | 11/2015 | Barker | G06N 20/00 706/11 |
| 2016/0357660 A1 | 12/2016 | Dean et al. | |
| 2017/0003948 A1* | 1/2017 | Iyer | H04L 43/045 |
| 2017/0262360 A1 | 9/2017 | Kochura et al. | |
| 2019/0050771 A1* | 2/2019 | Meharwade | G06Q 10/067 |
| 2019/0108001 A1 | 4/2019 | Hauser | |
| 2019/0108115 A1* | 4/2019 | Gonen | G06F 11/3433 |
| 2019/0182323 A1* | 6/2019 | Srinivasan | G06F 9/4856 |
| 2019/0188584 A1* | 6/2019 | Rao | G06Q 10/00 |
| 2019/0220253 A1 | 7/2019 | Pradhan et al. | |
| 2019/0294525 A1* | 9/2019 | Scheiner | G06F 11/3608 |
| 2019/0370662 A1* | 12/2019 | Song | G06N 7/005 |
| 2019/0391866 A1* | 12/2019 | Ampabathina | H04L 67/10 |
| 2020/0004648 A1* | 1/2020 | Xu | G06F 9/522 |
| 2020/0005096 A1* | 1/2020 | Calmon | G06K 9/6218 |
| 2020/0014588 A1* | 1/2020 | Narang | G06N 20/00 |
| 2020/0019393 A1* | 1/2020 | Vichare | G06F 8/60 |
| 2020/0034197 A1* | 1/2020 | Nagpal | G06N 20/00 |
| 2020/0097388 A1* | 3/2020 | Bhat | G06N 20/00 |
| 2020/0133830 A1* | 4/2020 | Sharma | G06Q 10/06312 |
| 2020/0174774 A1* | 6/2020 | Natarajan | G06N 20/00 |
| 2020/0174904 A1* | 6/2020 | Desai | H04L 67/10 |
| 2020/0293657 A1* | 9/2020 | Chai | G06F 11/3452 |
| 2020/0300495 A1* | 9/2020 | Kingetsu | G05B 13/028 |
| 2020/0310769 A1* | 10/2020 | Veljanoski | G06F 17/18 |
| 2020/0327419 A1* | 10/2020 | Zhang | G06F 17/18 |
| 2020/0372386 A1* | 11/2020 | Kotolyan | G06F 17/18 |
| 2020/0379858 A1* | 12/2020 | Xu | G06F 11/0757 |

\* cited by examiner

DEPLOYMENT SCHEDULING USING FAILURE RATE PREDICTION

TECHNICAL FIELD

The present invention relates generally to a method, system, and computer program product for software release scheduling. More particularly, the present invention relates to a method, system, and computer program product for deployment scheduling using failure rate prediction.

BACKGROUND

In a service-oriented software architecture, application components provide services to other application components, often over a network. A service is a discrete, self-contained unit that provides a specified set of functions to other application components. Each service is typically independently maintained and deployed, although this is not required. Because services are independent of each other, they need not all be implemented in the same programming language, database, or hardware or software environment, and need not all execute on the same system. Services' modularity lends itself to a continuous delivery software development process, in which small changes to an application are implemented, tested, and released at frequent intervals. Using a service-oriented architecture, a change to a portion of an application requires changing, rebuilding, and redeploying only a few services at a time.

A feature of an application is a task the application is capable of performing. A feature typically includes one or more functionalities, or sub-features. For example, in a banking application, one feature might be to generate an activity history for an account. Functionalities within the feature might include user interface components by which a user can specify an account number, a date range, and types of activities that should be displayed, a communications component to translate the user's inputs into a request to a back end component, a back end component to generate the requested data, another communications component to provide the requested data to the requestor, and a user interface component to display the resulting data. Implementing each functionality requires implementing a new service, changing one or more existing services that other software is already using, or a combination of new and updated services. Thus, a functionality deployment includes a deployment of one or more services, and functionality deployment data includes data of the deployment of the services. Typically, a new or updated service is developed, tested, and then deployed in a production environment.

A container is an isolated instance in which application software runs. One container contains one or more services.

SUMMARY

The illustrative embodiments provide a method, system, and computer program product. An embodiment includes a method that constructs, for a training set of functionality deployments, a failure rate model, the failure rate model modeling a failure rate of a training functionality deployment in the training set of functionality deployments, the failure rate model configured to receive, over a data communication channel from a first computer system, functionality deployment data comprising a program code for installation on a second computer system for responding to a service request from an application, the failure rate model further configured to, when provided with the functionality deployment data, output a corresponding failure rate prediction to a data repository. An embodiment receives, over the data communications channel, data of a set of upcoming functionality deployments, the data comprising, for an upcoming functionality deployment in the set of upcoming functionality deployments, upcoming functionality program code for installation on the second computer system for responding to a service request from an application. An embodiment predicts, using the failure rate model, a set of functionality deployment failure rates, a functionality deployment failure rate in the set of functionality deployment failure rates corresponding to the upcoming functionality deployment, the functionality deployment failure rate comprising an expected failure rate of the upcoming functionality deployment. An embodiment constructs, using the set of functionality deployment failure rates, a deployment sequence of the set of upcoming functionality deployments, the deployment sequence constructed to minimize a predicted overall failure rate of the set of upcoming functionality deployments. An embodiment causes the deployment of each functionality deployment in the set of upcoming functionality deployments, the deployment comprising activating the upcoming functionality program code, the upcoming functionality program code implementing each functionality by executing on the computer system, the activating performed according to the deployment sequence.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
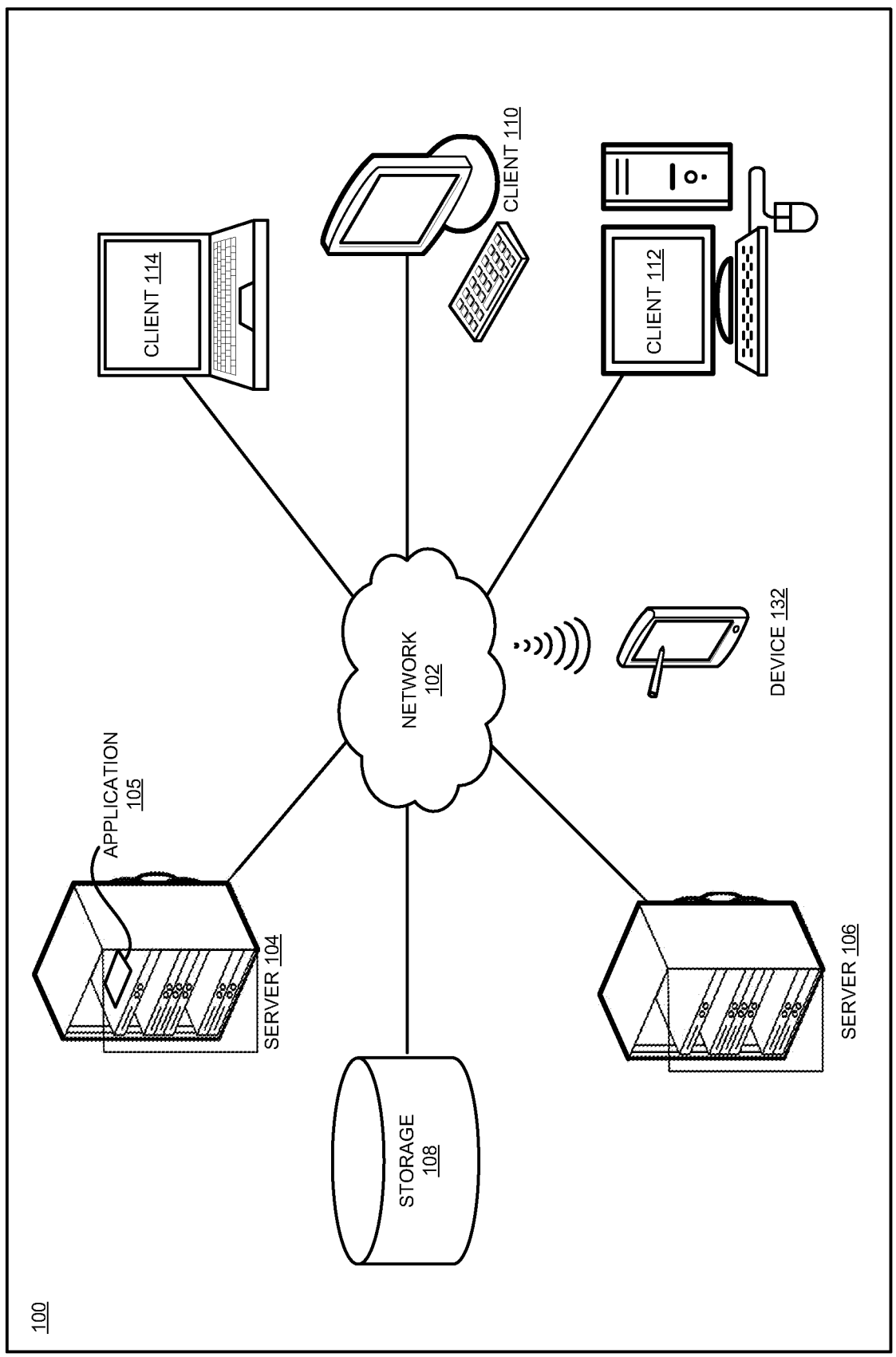
FIG. 1 depicts a block diagram of a network of data processing systems in which illustrative embodiments may be implemented.

The illustrative embodiments recognize that, even when a new or updated service passes a set of validations as a standalone service or within a test environment, the service might not deploy successfully. A deployment failure has occurred when a service reports a deployment failure (for example, with a completion code indicating a failure) fails to report that it has successfully deployed (for example, with a completion code indicating success) or when a service does not respond to a request for service within a predetermined time period. A deployment failure can occur because of a gap in the validation test suite, because testing as a standalone service or within a test environment does not perfectly match a production deployment environment, or for another reason.

The illustrative embodiments also recognize that predicting deployment failures is difficult. Although code management systems are capable of generating data about deployment successes and failures, it is difficult to determine which elements of a large dataset are relevant in that predicting deployment failures, and to what degree. In addition, because a change to one service can affect other services and application components, different deployment sequences can result in different numbers of deployment failures. Further, dependencies between services are often not well understood until a failure occurs and must be investigated. This prediction difficulty makes it difficult to effectively plan, staff, and schedule software projects. Consequently, the illustrative embodiments recognize that there is a need for improved deployment failure rate prediction, and improved deployment scheduling using the improved failure rate prediction.

The illustrative embodiments recognize that the presently available tools or solutions do not address these needs or provide adequate solutions for these needs. The illustrative embodiments used to describe the invention generally address and solve the above-described problems and other problems related to deployment scheduling using failure rate prediction.

An embodiment can be implemented as a software application. The application implementing an embodiment can be configured as a modification of an existing software deployment management system, as a separate application that operates in conjunction with an existing software deployment management system, a standalone application, or some combination thereof.

Particularly, some illustrative embodiments provide a method that constructs a deployment failure rate model using training data of a set functionality deployments. The method uses the model to predict a set of failure rates for a set of upcoming functionality deployments and uses the predicted failure rates to construct a deployment sequence for the upcoming deployments.

An embodiment uses training data of a set of functionality deployments to construct a deployment failure rate model. The failure rate model models a failure rate of a functionality deployment within the training data. One embodiment receives training data over a data communication channel from a computer system, and outputs the modeled failure rate to a data repository.

The training data of a set of functionality deployments includes result data for each of the set of functionality deployments. Result data includes success or failure data for one or more services within each deployment. In one embodiment, failure data is simply the number of services that failed to successfully deploy within a functionality deployment. In another embodiment, failure data is normalized to a standard range (e.g. 0-1. In another embodiment, failure data is converted to a failure rate (e.g., the number of services that failed to successfully deploy divided by the total number of services within the functionality deployment).

The training data of a set of functionality deployments also includes additional data about each of the set of functionality deployments. One non-limiting example of additional functionality deployment data is the code size of the code in the functionality deployment, measured by the number of lines of source code, the size of the corresponding executable code, or another code size measure. Another non-limiting example of additional functionality deployment data is the code size of the application in which the new functionality is being deployed, measured by the number of lines of source code, the size of the corresponding executable code, or another code size measure. There is less room to introduce errors in a smaller deployment than in a larger one, and deployments with a smaller code size are likely to be less complex than deployments with a larger code size. Thus, deployments with a smaller code size may be less likely to include an error resulting in a deployment failure. Similarly, a deployment that adds additional code to a smaller existing application has fewer opportunities to introduce errors into a likely less complex application than a deployment into a larger existing application. Thus, deployments into a smaller existing application may be less likely to include an error resulting in a deployment failure.

Another non-limiting example of additional functionality deployment data is time taken compiling (or otherwise preparing for execution) the source code in the functionality deployment. Deployments that take longer to compile are often larger or more complex than deployments that take less time to compile, and hence may be more likely to include an error resulting in a deployment failure.

Another non-limiting example of additional functionality deployment data is time taken to deploy or release elements of the functionality deployment. Deployments that take longer to deploy or release often include more process steps or more code changes, adding to deployment complexity, and hence may be more likely to include an error resulting in a deployment failure.

Another non-limiting example of additional functionality deployment data is the number of functions in which source code was changed or added code in the functionality deployment. Another non-limiting example of additional functionality deployment data is the number of source code changes or additions in the functionality deployment, counted using the number of lines changed or added, the number of source code files changed or added, or another method. There is less room to introduce errors when the number of changed locations is smaller than when it is larger. Thus, deployments with fewer changed locations may be less likely to include an error resulting in a deployment failure.

Another non-limiting example of additional functionality deployment data is the number of automation jobs in the functionality deployment. An automation job is a task within development of a deployment than is performed automatically, and does not require manual intervention. Some examples of automation jobs are code compilation and automated code testing. Manual, human intervention offers more opportunity for human error than automated processes, and thus a deployment with a higher number of automation jobs may be less likely to include an error resulting in a deployment failure than a deployment with a lower number of automation jobs.

Other non-limiting examples of additional functionality deployment data involve application quality measures, such as the percentage of validation tests that pass in a particular testing phase and the time taken to execute one or more suites of validation tests. A deployment with a longer test execution time may be tested more thoroughly than a deployment with a shorter test execution time. A deployment that is more thoroughly tested, or which has a higher test passing rate, may be less likely to include an error resulting in a deployment failure than a deployment that is less thoroughly tested or has a lower test passing rate Another non-limiting example of additional functionality deployment data is the transaction count, i.e. the number of service requests made to a deployed service once deployed. Another non-limiting example of additional functionality deployment data is the user count, i.e. the number of users making service requests made to a deployed service within a time period. Another non-limiting example of additional functionality deployment data is a code usage rate measured using a different technique. A deployment with higher code usage rate, as measured by larger numbers of transactions users, or using another technique, may be more likely to result in a deployment failure than a deployment with a lower code usage rate.

Another non-limiting example of additional functionality deployment data is the number of services implemented within one application binary. Another non-limiting example of additional functionality deployment data is the number of containers an application uses. A deployment with more services and containers may be more likely to result in a deployment failure than a deployment with fewer services and containers.

Other types of functionality deployment data are also possible and contemplated within the scope of the illustrative embodiments. In addition, one embodiment uses cluster analysis, penalized regression, or other presently-available data analysis techniques to identify additional types of functionality deployment data.

An embodiment models a failure rate for a deployment of a feature as a sum of failure rates for each functionality deployment within the feature. To model failure rates for each functionality deployment within the feature, an embodiment uses one or more penalized regression techniques. In particular, if the modeled failure rate is represented by Y, the modeled failure rate is determined using the expression $Y=\beta_0 x_1 + \beta_1 x_2 + \beta_2 x_3 + \ldots$, each of $x_1, x_2, x_3$, etc. represent variables and each of $\beta_0, \beta_1, \beta_2$, etc. represent coefficients, or weights, corresponding to each variable. For training data of a set of functionality deployments, the failure rate is known. However, not all functionality deployment data contributes equally to a deployment failure rate. Some types of data might have a relatively large contribution, and other types of data might have a relatively smaller contribution. In addition, some types of data might correlate well enough with other types of data that only one need be used. For example, because larger code sizes typically take longer to build than smaller code sizes, code size and build time might correlate well enough that using only one of code size and build time predicts the same failure rate results as using both types of data, and thus using both types of data is unnecessary. As well, different types of development projects might have different characteristics, and thus have different relative contributions for different types of functionality deployment data. Further, it is more efficient to collect only a few types of data that are most important in failure rate prediction, and not collect other types of data that do not meaningfully contribute to a failure rate prediction. Thus, an embodiment determines, as model variables, a subset of the types of data that are most important in failure rate prediction, and determines a coefficient corresponding to the relative weight each type of data in the subset is to be given.

To select model variables and coefficients, an embodiment uses one or more penalized regression techniques. Penalized regression techniques constrain coefficients by shrinking them towards zero, using a tuning parameter. If the amount of shrinkage is large enough, these methods can also shrink some coefficients to zero, reducing the number of variables in the model and thus simplifying the model. Penalized regression techniques produce a series of models, each with a different set of coefficients corresponding to a unique value of the tuning parameter. Each model in the series has a prediction error (i.e. the difference between the result the model predicted and the actual result) that can be estimated using presently-available techniques. The model in the series with the lowest prediction error is chosen as the final model. An embodiment generates the series of models using the elastic net regression technique, the ridge regression technique, the LASSO regression technique, or another presently-available penalized regression technique. Another embodiment generates multiple series of models, each using a different penalized regression technique, then selects the overall best model from the best of each series. One technique for estimating prediction error uses cross validation, in which a model is fit to a subset of a set of training data and then tested against the remainder of the training data. Other techniques for estimating prediction error are also presently available, and the same are contemplated within the scope of the illustrative embodiments.

An embodiment uses the failure rate model to predict functionality deployment failure rates for functionality deployments within an upcoming deployment of a set of functionalities. One embodiment receives functionality deployment data over a data communications channel. If each functionality deployment were independent of other deployments in the set, deployment sequence would not matter. However, individual functionality deployments are rarely independent of each other. For example, consider a failure rate model that includes two variables, the code size of the deployment and the code size of the existing application into which the functionalities are being deployed. Here, deploying a small functionality into a small application, followed by deploying a much larger functionality into the same small application, could have one predicted failure rate, while deploying the larger functionality into a small application first, and then deploying the smaller functionality, could have a different predicted failure rate. Note that this is a very simple example, and a set of functionality deployments can include more than two deployments and a complex set of dependencies among individual deployments.

An embodiment uses the failure rate model to predict functionality deployment failure rates for a sequence of functionality deployments within an upcoming deployment. One embodiment constructs a set of deployment sequences and uses the failure rate model to predict failure rates for each deployment in each sequence. The deployment sequence with the lowest predicted failure rate is considered to be the best deployment sequence for use in implementing the upcoming deployment.

To construct the set of deployment sequences, one embodiment determines all the possible permutations of the set of functionality deployments and evaluates each one. However, while evaluating all possible permutations is always theoretically possible, such an exhaustive evaluation may not be practical for larger sets of deployments. Thus, another embodiment uses a presently-available genetic algorithm to construct and evaluate deployment sequences. When using a genetic algorithm, an embodiment generates a set of random sequences and evaluates the failure rate for each sequence. An embodiment stochastically selects the best sequences (i.e. those with the lowest failure rate), modifies them in a predefined manner, and reevaluates the results. An embodiment continues iterating until a maximum number of iterations has occurred, a sequence with a below-threshold failure rate has been found, the failure rate fails to improve by more than a threshold amount, or another completion criterion has been met. Thus, using the genetic algorithm, an embodiment constructs a deployment sequence with a "good enough" failure rate, without having to evaluate every possible permutation. In addition, an embodiment causes deployment of each functionality deployment in the constructed deployment sequence, by causing the activation of program code for each functionality.

The manner of deployment scheduling using failure rate prediction described herein is unavailable in the presently available methods in the technological field of endeavor pertaining to software deployment management. A method of an embodiment described herein, when implemented to execute on a device or data processing system, comprises substantial advancement of the functionality of that device or data processing system in constructing a deployment failure rate model using training data of a set functionality deployments. The method uses the model to predict a set of failure rates for a set of upcoming functionality deployments and uses the predicted failure rates to construct a deployment sequence for the upcoming deployments.

The illustrative embodiments are described with respect to certain types of deployments, functionalities, features, sequences, permutations, services, architectures, thresholds, rankings, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
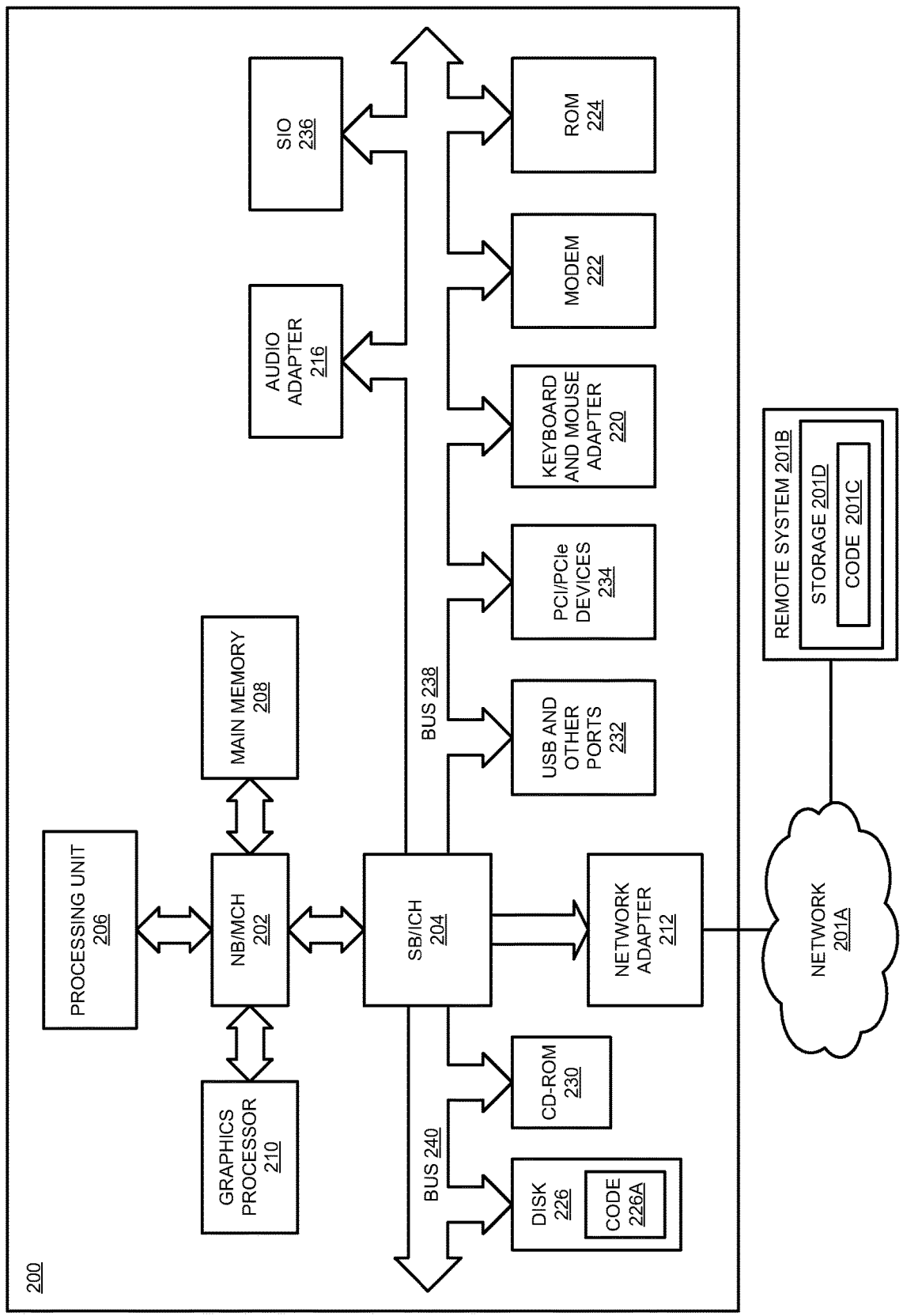
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
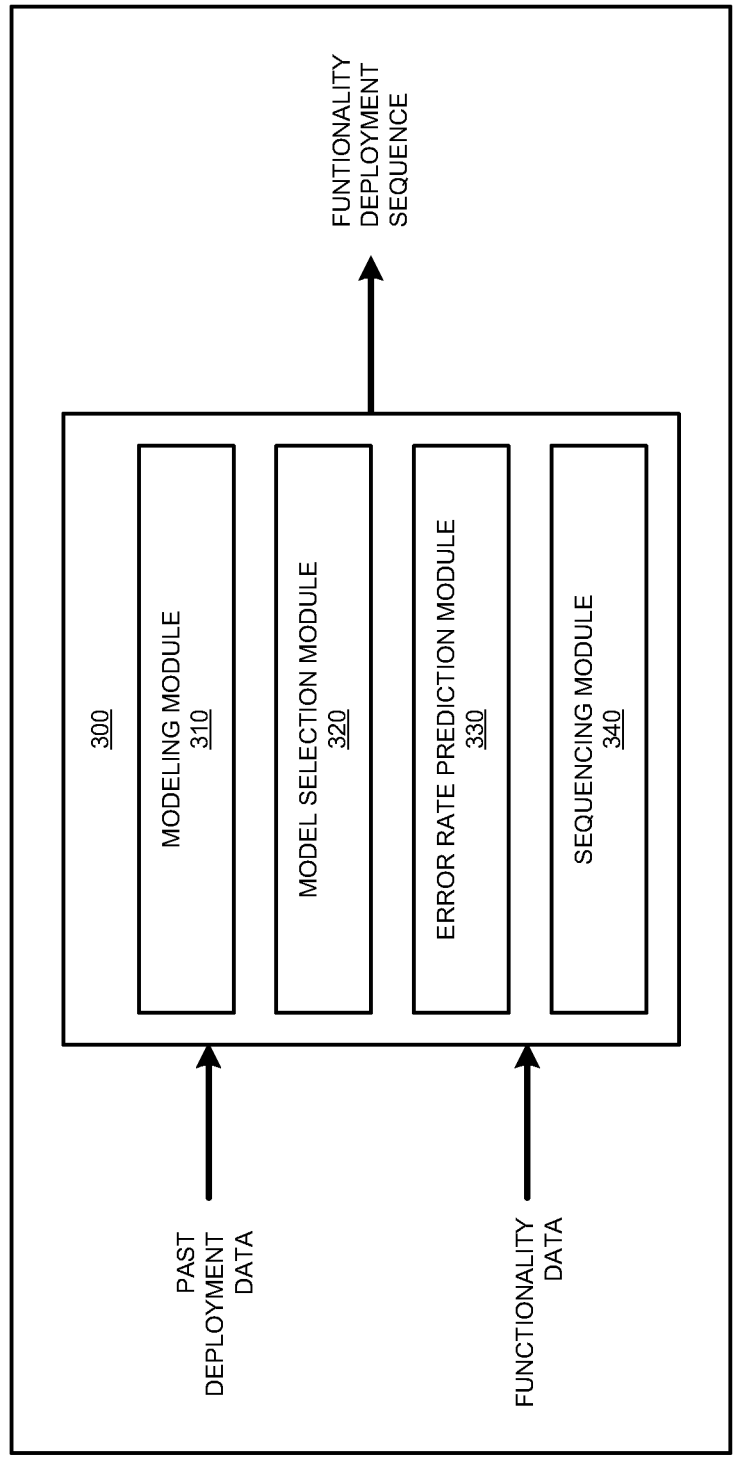
FIG. 3 depicts a block diagram of an example configuration for deployment scheduling using failure rate prediction in accordance with an illustrative embodiment.

With reference to FIG. 3, this figure depicts a block diagram of an example configuration for deployment scheduling using failure rate prediction in accordance with an illustrative embodiment. Application 300 is an example of application 105 in FIG. 1 and executes in any of servers 104 and 106, clients 110, 112, and 114, and device 132 in FIG. 1.

Modeling module 310 uses training data of a set of functionality deployments to construct a deployment failure rate model. The failure rate model models a failure rate of a functionality deployment within the training data.

The training data of a set of functionality deployments includes result data for each of the set of functionality deployments. Result data includes success or failure data for each service within each deployment. The training data of a set of functionality deployments also includes additional data about each of the set of functionality deployments.

In particular, module 310 models a failure rate for a deployment of a feature as a sum of failure rates for each functionality deployment within the feature, using one or more penalized regression techniques. Penalized regression techniques produce a series of models, each with a different set of coefficients corresponding to a unique value of a tuning parameter. Each model in the series has a prediction error (i.e. the difference between the result the model predicted and the actual result) that can be estimated using presently-available techniques. The model in the series with the lowest prediction error is chosen as the final model. One implementation of application 300 uses three versions of module 310 to generates the series of models using the elastic net regression technique, the ridge regression technique, and the LASSO regression technique, then model selection module 320 selects the overall best model from the best of each series. Thus, modules 310 and 320 determine, as model variables, a subset of the types of data that are most important in failure rate prediction, and determine a coefficient corresponding to the relative weight each type of data in the subset is to be given.

Sequencing module 340 constructs a set of deployment sequences. Error rate prediction module 330 uses the failure rate model to predict failure rates for each deployment in each sequence. The deployment sequence with the lowest predicted failure rate is considered to be the best deployment sequence for use in implementing the upcoming deployment.

To construct the set of deployment sequences, one implementation of module 340 determines all the possible permutations of the set of functionality deployments, and module 330 evaluates each permutation. Another implementation of module 340 uses a presently-available genetic algorithm to construct a set of iterations of deployment sequences until a maximum number of iterations has occurred, a sequence with a below-threshold failure rate has been found, the failure rate fails to improve by more than a threshold amount, or another completion criterion has been met. Thus, using the genetic algorithm, module 340 constructs a deployment sequence with a "good enough" failure rate, without having module 330 evaluate every possible permutation.

Figure 4:
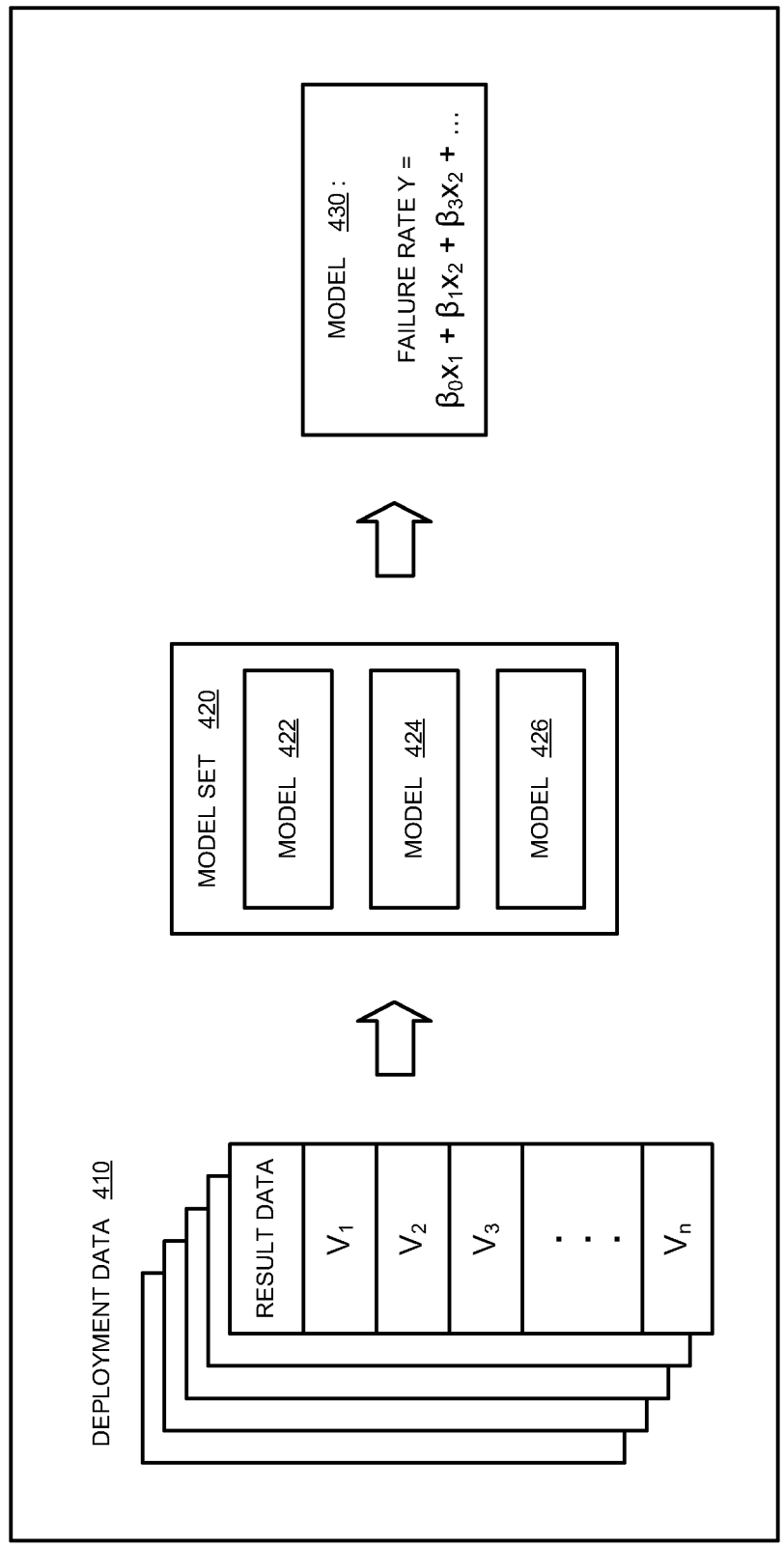
FIG. 4 depicts an example of deployment scheduling using failure rate prediction in accordance with an illustrative embodiment.

With reference to FIG. 4, this figure depicts an example of deployment scheduling using failure rate prediction in accordance with an illustrative embodiment. The example can be executed using application 300 in FIG. 3.

Deployment data 410 is training data of a set of functionality deployments. Data 410 includes result data for each of the set of functionality deployments. Data 410 also includes additional data about each of the set of functionality deployments, symbolized by variables $V_1, V_2, \ldots, V_n$.

Model set 420 includes models 422, 424, and 426, each the best of a series of models generated using different regression techniques. Model 430 is the overall best model from the models in model set 420. In model 430, the modeled failure rate is represented by Y and the modeled failure rate is determined using the expression $Y = \beta_0 x_1 + \beta_1 x_2 + \beta_2 x_3 + \ldots$, each of $x_1, x_2, x_3$, etc. represent variables and each of $\beta_0, \beta_1, \beta_2$, etc. represent coefficients, or weights, corresponding to each variable.

Figure 5:
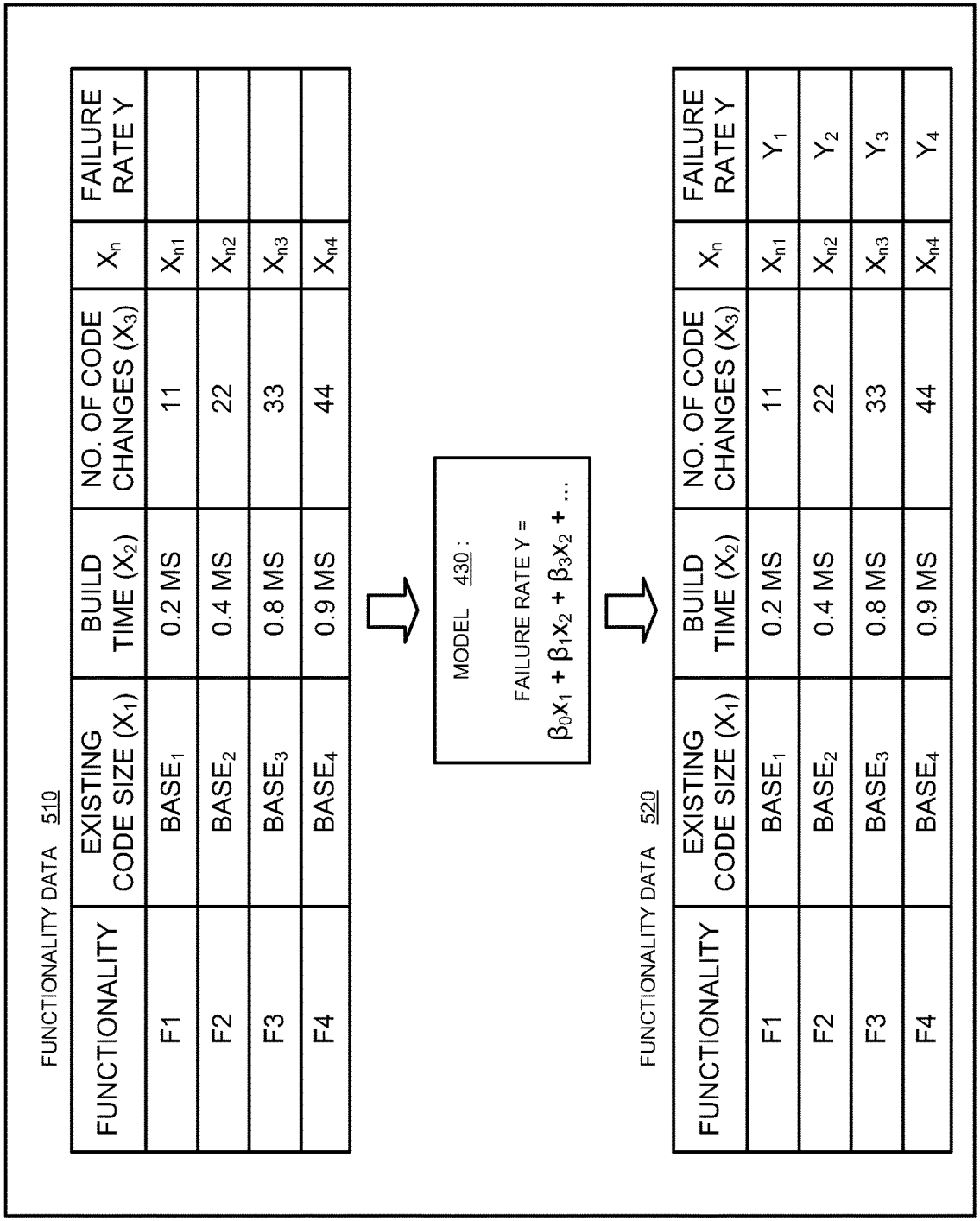
FIG. 5 depicts a continued example of deployment scheduling using failure rate prediction in accordance with an illustrative embodiment.

With reference to FIG. 5, this figure depicts a continued example of deployment scheduling using failure rate prediction in accordance with an illustrative embodiment. The example can be executed using application 300 in FIG. 3. Model 430 is the same as model 430 in FIG. 4.

As depicted, application 300 uses model 430 to predict failure rate data for deployments of each of the functionalities F1, F2, F3, and F4 in functionality data 510. Model 430 includes variables $X_1$ (the existing code size of the application in which the functionalities are being deployed into), $X_2$ (the build time for the functionality), $X_3$ (the number of code changes in the functionality), and another variable symbolized by $X_n$. The results, $Y_1$, $Y_2$, $Y_3$, and $Y_4$ respectively, are shown in functionality data 520.

Figure 6:
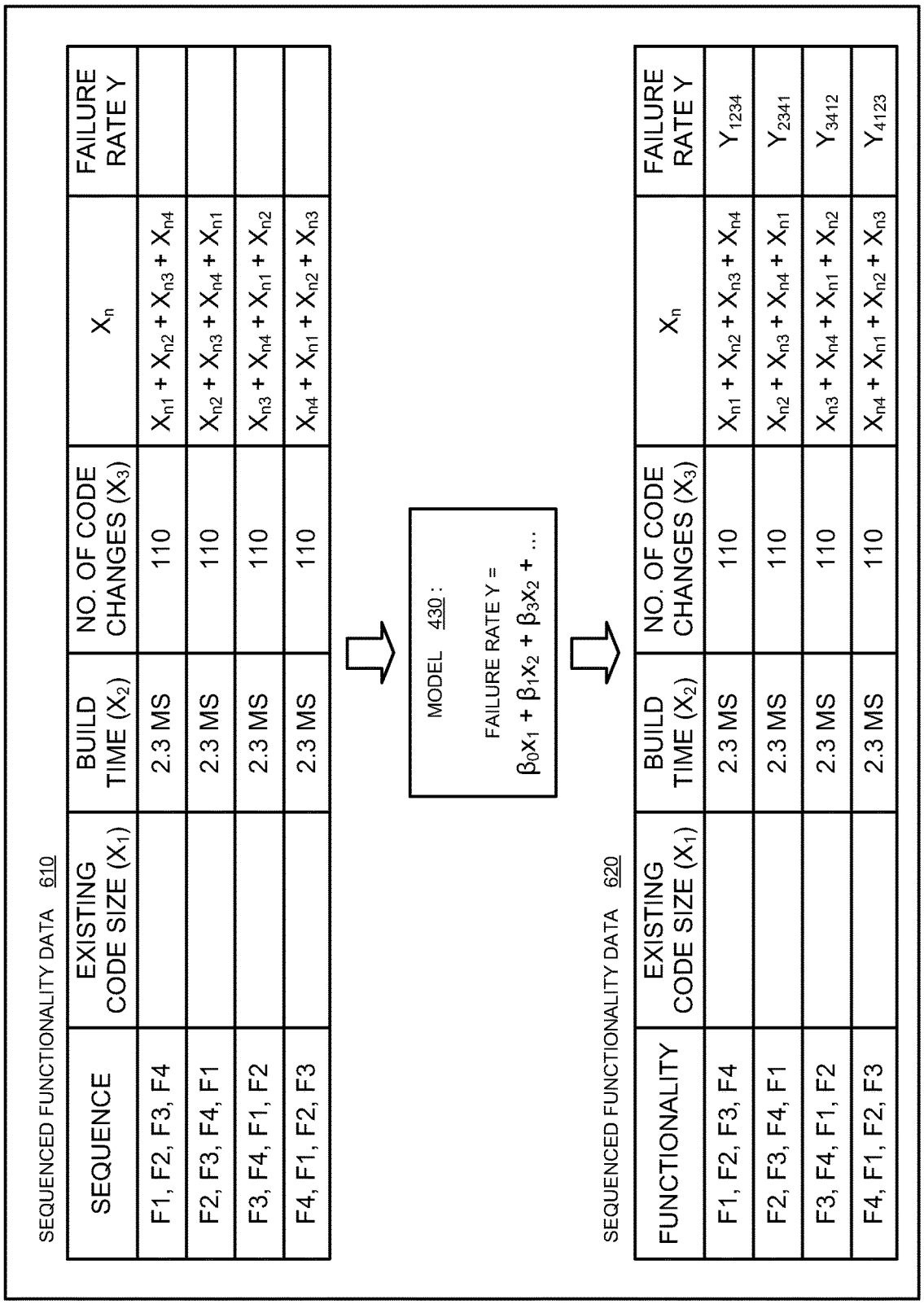
FIG. 6 depicts a continued example of deployment scheduling using failure rate prediction in accordance with an illustrative embodiment.

With reference to FIG. 6, this figure depicts a continued example of deployment scheduling using failure rate prediction in accordance with an illustrative embodiment. The example can be executed using application 300 in FIG. 3. Model 430 is the same as model 430 in FIG. 4.

As depicted, application 300 uses model 430 to predict failure rate data for deployments of each of the sequenced functionalities in functionality data 610. The sequences represent four permutations of a sequence for deploying functionalities F1, F2, F3, and F4. Model 430 includes variables $X_1$ (the existing code size of the application in which the functionalities are being deployed into), $X_2$ (the build time for the functionality), $X_3$ (the number of code changes in the functionality), and another variable symbolized by $X_n$. $X_n$ for a particular sequence is the sum of the $X_n$ values for each functionality in the sequence. The results, $Y_{1234}$, $Y_{2341}$, $Y_{3412}$, and $Y_{4123}$ respectively, are shown in functionality data 620.

Figure 7:
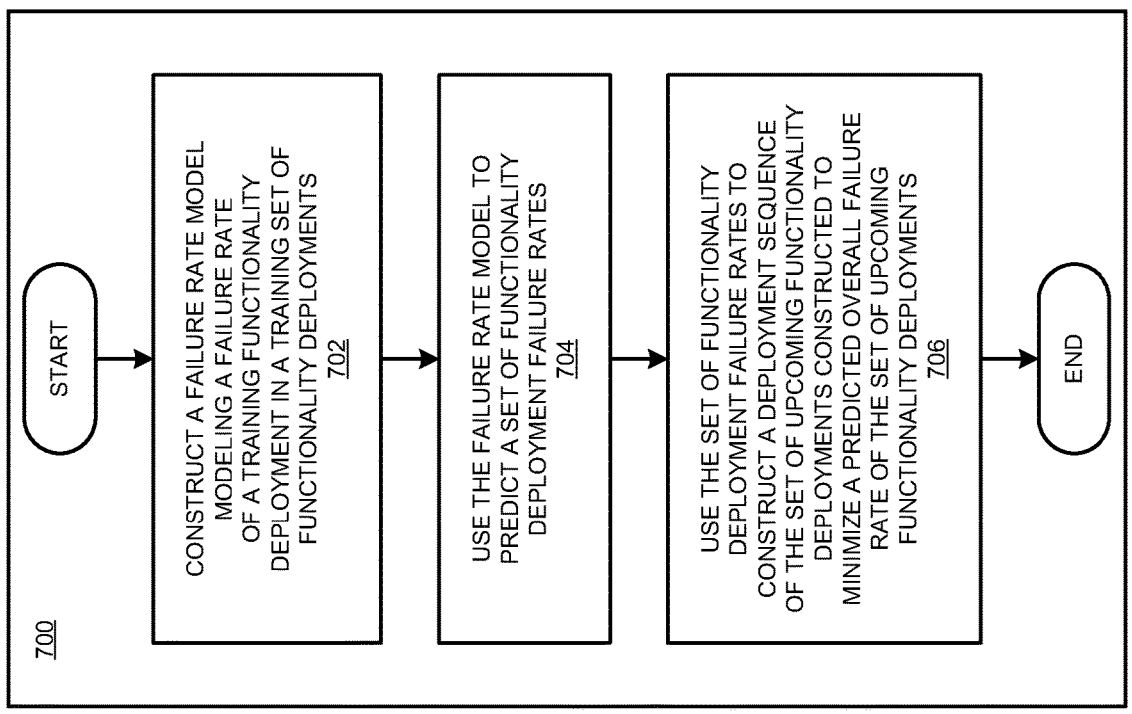
FIG. 7 depicts a flowchart of an example process for deployment scheduling using failure rate prediction in accordance with an illustrative embodiment.

With reference to FIG. 7, this figure depicts a flowchart of an example process for deployment scheduling using failure rate prediction in accordance with an illustrative embodiment. Process 700 can be implemented in application 300 in FIG. 3.

In block 702, the application constructs a failure rate model modeling a failure rate of a training functionality deployment in a training set of functionality deployments. In block 704, the application uses the failure rate model to predict a set of functionality deployment failure rates. In block 706, the application uses the set of functionality deployment failure rates to construct a deployment sequence of the set of upcoming functionality deployments constructed to minimize a predicted overall failure rate of the set of upcoming functionality deployments. Then the application ends.

Thus, a computer implemented method, system or apparatus, and computer program product are provided in the illustrative embodiments for deployment scheduling using failure rate prediction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
constructing, for a training set of functionality deployments, a failure rate model, the failure rate model modeling a failure rate of a training functionality deployment in the training set of functionality deployments, the failure rate model configured to receive, over a data communication channel from a first computer system, functionality deployment data comprising a program code for installation on a second computer system for responding to a service request from an application, the failure rate model further configured to, when provided with the functionality deployment data, output a corresponding failure rate prediction to a data repository;
receiving, over the data communications channel, data of a set of upcoming functionality deployments, the data comprising, for an upcoming functionality deployment in the set of upcoming functionality deployments, upcoming functionality program code for installation on the second computer system for responding to a service request from an application;
constructing, using a permutation technique, a plurality of deployment sequences of the set of upcoming functionality deployments, each deployment sequence comprising a possible sequence by which each upcoming functionality deployment of the set of upcoming functionality deployments is to be deployed onto the second computer system;
predicting, using the failure rate model, a set of functionality deployment failure rates, a functionality deployment failure rate in the set of functionality deployment failure rates corresponding to the upcoming functionality deployment, the functionality deployment failure rate comprising an expected failure rate of the upcoming functionality deployment when deployed using one of the plurality of deployment sequences; and
causing the deployment of each functionality deployment in the set of upcoming functionality deployments according to a selected deployment sequence in the plurality of deployment sequences constructed based on the predicted set of functionality deployment failure rates, the selected deployment sequence constructed to minimize a predicted overall failure rate of the set of upcoming functionality deployments, the deployment comprising activating the upcoming functionality program code, the upcoming functionality program code implementing each functionality by executing on the second computer system, the activating performed according to the selected deployment sequence.

2. The computer-implemented method of claim 1, wherein the failure rate model comprises a set of variables and a set of coefficients, a coefficient in the set of coefficients corresponding to a variable in the set of variables.

3. The computer-implemented method of claim 2, wherein constructing the failure rate model comprises:
determining, using a penalized regression technique, the set of variables and the set of coefficients.

4. The computer-implemented method of claim 1, wherein the training set of functionality deployments comprises functionality deployment data and result data corresponding to the functionality deployment data.

5. The computer-implemented method of claim 1, wherein the permutation technique comprises a genetic algorithm.

6. A computer usable program product comprising one or more computer-readable storage media, and program instructions stored on at least one of the one or more storage media, the stored program instructions when executed by a processor causing operations comprising:

constructing, for a training set of functionality deployments, a failure rate model, the failure rate model modeling a failure rate of a training functionality deployment in the training set of functionality deployments, the failure rate model configured to receive, over a data communication channel from a first computer system, functionality deployment data comprising a program code for installation on a second computer system for responding to a service request from an application, the failure rate model further configured to, when provided with the functionality deployment data, output a corresponding failure rate prediction to a data repository;

receiving, over the data communications channel, data of a set of upcoming functionality deployments, the data comprising, for an upcoming functionality deployment in the set of upcoming functionality deployments, upcoming functionality program code for installation on the second computer system for responding to a service request from an application;

constructing, using a permutation technique, a plurality of deployment sequences of the set of upcoming functionality deployments, each deployment sequence comprising a possible sequence by which each upcoming functionality deployment of the set of upcoming functionality deployments is to be deployed onto the second computer system;

predicting, using the failure rate model, a set of functionality deployment failure rates, a functionality deployment failure rate in the set of functionality deployment failure rates corresponding to the upcoming functionality deployment, the functionality deployment failure rate comprising an expected failure rate of the upcoming functionality deployment when deployed using one of the plurality of deployment sequences; and causing the deployment of each functionality deployment in the set of upcoming functionality deployments according to a selected deployment sequence in the plurality of deployment sequences constructed based on the predicted set of functionality deployment failure rates, the selected deployment sequence constructed to minimize a predicted overall failure rate of the set of upcoming functionality deployments, the deployment comprising activating the upcoming functionality program code, the upcoming functionality program code implementing each functionality by executing on the second computer system, the activating performed according to the selected deployment sequence.

7. The computer usable program product of claim 6, wherein the failure rate model comprises a set of variables and a set of coefficients, a coefficient in the set of coefficients corresponding to a variable in the set of variables.

8. The computer usable program product of claim 7, wherein constructing the failure rate model comprises:
determining, using a penalized regression technique, the set of variables and the set of coefficients.

9. The computer usable program product of claim 6, wherein the training set of functionality deployments comprises functionality deployment data and result data corresponding to the functionality deployment data.

10. The computer usable program product of claim 6, wherein the permutation technique comprises a genetic algorithm.

11. The computer usable program product of claim 6, wherein the stored program instructions are stored in the at least one of the one or more computer-readable storage media of a local data processing system, and wherein the stored program instructions are transferred over a network from a remote data processing system.

12. The computer usable program product of claim 6, wherein the stored program instructions are stored in the at least one of the one or more computer-readable storage media of a server data processing system, and the stored program instructions are downloaded over a network to a remote data processing system for use in a computer readable storage device associated with the remote data processing system.

13. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions when executed by a processor causing operations comprising:

constructing, for a training set of functionality deployments, a failure rate model, the failure rate model modeling a failure rate of a training functionality deployment in the training set of functionality deployments, the failure rate model configured to receive, over a data communication channel from a first computer system, functionality deployment data comprising a program code for installation on a second computer system for responding to a service request from an application, the failure rate model further configured to, when provided with the functionality deployment data, output a corresponding failure rate prediction to a data repository;

receiving, over the data communications channel, data of a set of upcoming functionality deployments, the data comprising, for an upcoming functionality deployment in the set of upcoming functionality deployments, upcoming functionality program code for installation on the second computer system for responding to a service request from an application;

constructing, using a permutation technique, a plurality of deployment sequences of the set of upcoming functionality deployments, each deployment sequence comprising a possible sequence by which each upcoming functionality deployment of the set of upcoming functionality deployments is to be deployed onto the second computer system;

predicting, using the failure rate model, a set of functionality deployment failure rates, a functionality deployment failure rate in the set of functionality deployment failure rates corresponding to the upcoming functionality deployment, the functionality deployment failure rate comprising an expected failure rate of the upcoming functionality deployment when deployed using one of the plurality of deployment sequences; and causing the deployment of each functionality deployment in the set of upcoming functionality deployments according to a selected deployment sequence in the plurality of deployment sequences constructed based on the predicted set of functionality deployment failure rates, the selected deployment sequence constructed to minimize a predicted overall failure rate of the set of upcoming functionality deployments, the deployment comprising activating the upcoming functionality program code, the upcoming functionality program code implementing each functionality by executing on the second computer system, the activating performed according to the selected deployment sequence.

14. The computer system of claim 13, wherein the failure rate model comprises a set of variables and a set of coefficients, a coefficient in the set of coefficients corresponding to a variable in the set of variables.

15. The computer system of claim 14, wherein constructing the failure rate model comprises:
    determining, using a penalized regression technique, the set of variables and the set of coefficients.

16. The computer system of claim 13, wherein the training set of functionality deployments comprises functionality deployment data and result data corresponding to the functionality deployment data.

17. The computer system of claim 13, wherein the permutation technique comprises a genetic algorithm.

\* \* \* \* \*